P. Jones,
Making Fellies.
Nº 34,835.      Patented Apr. 1, 1862.

Witnesses:     Fig. 3.     Inventor:

James Laird

E. du N. Hodgen ically used for all other purposes

UNITED STATES PATENT OFFICE.

PHINEAS JONES, OF NEWARK, NEW JERSEY.

IMPROVEMENT IN DOWELING.

Specification forming part of Letters Patent No. 34,835, dated April 1, 1862.

*To all whom it may concern:*

Be it known that I, PHINEAS JONES, of Newark, in the county of Essex and State of New Jersey, have invented a new and useful Improvement in Doweling; and I do hereby declare that the following is a full, clear, and exact description of the same, reference being had to the accompanying drawings, making a part of this specification, in which—

Figure 1:
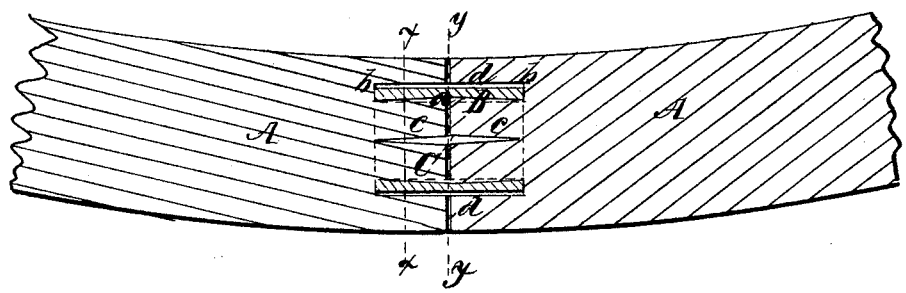
Figure 2:
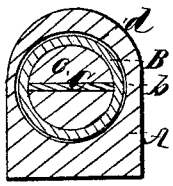
Figure 2:
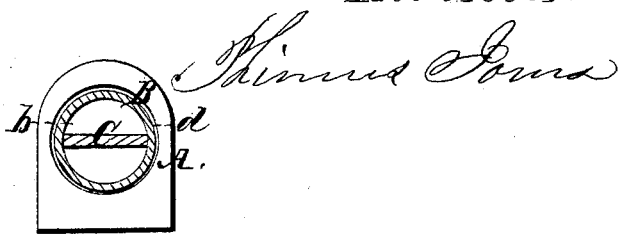

Figure 1 is a longitudinal section of my invention shown applied to the ends of two fellies and connecting the same together; Fig. 2, a section of the same taken in the line $x\ x$, Fig. 1; Fig. 3, a section of the same taken in the line $y\ y$, Fig. 1.

Similar letters of reference indicate corresponding parts in the several figures.

This invention relates to a new and useful improvement in dowel-pins such as are used by joiners, cabinet-makers, wheelwrights, &c., for connecting together pieces of wood which abut against each other.

The object of the invention is to obtain a dowel which will firmly connect the parts together without the liability of the latter splitting by any transverse or lateral strain to which they may be subjected, and at the same time obviate the necessity of using pins or bolts to hold the dowel in proper place and prevent either of the connected parts being withdrawn from the dowel.

The invention is more especially designed for the use of wheelwrights to connect the ends of wheel-fellies together; but it may be advantageously used for all other purposes where dowels are employed.

It consists in constructing the dowel of a metallic tube and fitting or adjusting the same in the parts to be connected together, as hereinafter fully shown and described.

To enable those skilled in the art to fully understand and construct my invention, I will proceed to describe it.

A A represent the ends of two fellies, which abut against each other, as usual, and are connected together by my invention.

B is a metal tube, the external diameter of which is equal throughout; but the inner diameter is variable, it being greatest at its center, as shown at $a$, and gradually diminishing toward each end, as shown clearly in Fig. 1. This metal tube B forms the dowel and it is inserted into the ends of the fellies A A by cutting an annular recess $b$ in each one of them, so that when the dowel is adjusted in the recesses it will be filled with two cores $c\ c$, which form a part of the fellies, as shown clearly in Fig. 1. The annular recesses $b\ b$ are made a trifle wider than the thickness of the dowel B, so that when the latter is fitted in its recesses there will be a space $d$ all around the outer side of the dowel; but the cores $c\ c$ are designed to fit snugly in the dowel and form the means of attachment.

The interior of the dowel B is made of taper form, in order that the cores $c\ c$ may be be wedged tightly therein to form a dovetail lock. The wedge C employed for this purpose is of double form, as shown in Fig. 1, and the cores $c\ c$ correspond in diameter to the internal diameter of the dowel B at its ends. The ends of the cores $c\ c$ are split to receive the ends of the wedge C, and when the fellies are closed or driven together the wedge expands the cores and causes them to fill up the interior of B, thereby forming a dovetail lock and effectually preventing the fellies from separating or drawing apart.

The advantages of this improvement in doweling are as follows: first, the dowel will not split the wood under any lateral pressure to which it may be subjected, for the reason that the external surface of the dowel is not in contact with the wood, the space $d$ being allowed between. In this respect it will be seen that my invention differs essentially from the ordinary wooden dowel; second, by wedging the cores $c\ c$ within the dowel a dovetail lock is obtained to prevent the parts which the dowel connects being drawn apart; hence pins or bolts, which have been hitherto used for that purpose, and which weaken the connected parts by passing through them, are avoided. For connecting the ends of fellies together it possesses several advantages over the metallic clips hitherto used, as a firm connection is not only obtained, but it leaves the joint exposed, so that the workman can make a snug fit, gives a more finished appearance to the wheel, and is not liable to work loose—a contingency of frequent occurrence in almost all fastenings in which metal is used for connecting wooden parts together.

I would remark that in those cases where the connected parts cannot be casually withdrawn from the dowel the internal diameter of the latter may be equal throughout, in other respects the construction corresponding with the description herein given.

Having thus described my invention, what I claim as new, and desire to secure by Letters Patent, is—

1. A dowel B, formed of a metal tube fitted in annular recesses $b\ b$ in the parts to be connected, substantially as set forth.

2. Having the interior of the metal dowel B of variable diameter or of double taper or conical form, in combination with the wedge C, for the purpose of locking the cores $c\ c$ in the dowel, as described.

PHINEAS JONES.

Witnesses:
 EDW. W. HODGSON,
 JAMES LAIRD.